United States Patent
Russell (10) Patent No.: US 11,619,322 B1
(45) Date of Patent: Apr. 4, 2023

(54) CLEAN-OUT CAP LOCATOR

(71) Applicant: Jason Russell, Wesley Chapel, FL (US)

(72) Inventor: Jason Russell, Wesley Chapel, FL (US)

( * ) Notice: Subject to any disclaimer, the term of this patent is extended or adjusted under 35 U.S.C. 154(b) by 0 days.

(21) Appl. No.: 17/462,108

(22) Filed: Aug. 31, 2021

(51) Int. Cl.
| F16L 55/10 | (2006.01) |
| F16L 1/11 | (2006.01) |
| G01V 3/38 | (2006.01) |
| G01V 15/00 | (2006.01) |
| F16L 55/115 | (2006.01) |

(52) U.S. Cl.
CPC .............. *F16L 1/11* (2013.01); *F16L 55/1152* (2013.01); *G01V 3/38* (2013.01); *G01V 15/00* (2013.01)

(58) Field of Classification Search
CPC .......... F16L 1/11; F16L 55/1152; G01V 15/00
USPC ......................................... 138/104, 96 T, 89
See application file for complete search history.

(56) References Cited

U.S. PATENT DOCUMENTS

| 2,366,975 | A | * | 1/1945 | McChesney | ............. | F16L 45/00 |
| | | | | | | 138/89 |
| 4,764,332 | A | * | 8/1988 | Guina | ...................... | G01M 3/02 |
| | | | | | | 376/245 |
| 5,450,765 | A | * | 9/1995 | Stover | ...................... | F16L 55/11 |
| | | | | | | 73/866.5 |
| 6,850,161 | B1 | * | 2/2005 | Elliott | ................ | E21B 47/0232 |
| | | | | | | 340/539.2 |
| 7,298,279 | B1 | * | 11/2007 | Badon | ................. | F16L 55/1152 |
| | | | | | | 340/614 |
| 8,025,079 | B2 | * | 9/2011 | Wander | ................... | F16K 15/00 |
| | | | | | | 138/96 T |
| D852,333 | S | | 6/2019 | Sfredel | | |
| 10,753,907 | B2 | | 8/2020 | Bates | | |
| 2002/0175251 | A1 | * | 11/2002 | Robinson | ............... | G01D 11/30 |
| | | | | | | 248/206.5 |
| 2003/0047226 | A1 | * | 3/2003 | Hill | .......................... | F16L 1/11 |
| | | | | | | 138/104 |
| 2007/0131297 | A1 | * | 6/2007 | Spaolonzi | ............. | G01M 3/283 |
| | | | | | | 138/104 |
| 2008/0314468 | A1 | | 12/2008 | Houghton | | |
| 2009/0095211 | A1 | * | 4/2009 | Johns | ....................... | B01J 8/008 |
| | | | | | | 116/201 |
| 2010/0018312 | A1 | | 1/2010 | Kirkpatrick | | |
| 2011/0030875 | A1 | * | 2/2011 | Conte | .................. | F16L 55/1652 |
| | | | | | | 138/104 |

(Continued)

FOREIGN PATENT DOCUMENTS

WO         2013034706  f       3/2013

*Primary Examiner* — James F Hook
(74) *Attorney, Agent, or Firm* — Kyle A. Fletcher, Esq.

(57) ABSTRACT

The clean-out cap locator forms a cap that encloses a clean-out plug. The clean-out cap locator comprises a threaded cap, a control circuit, a remote control, and a personal data device. The control circuit determines the GPS coordinates of the control circuit. The control circuit transmits the GPS coordinates of the control circuit to the personal data device. The control circuit generates an audible alarm indicating the location of the clean-out cap locator. The control circuit senses the flow of fluid around near the clean-out cap locator. The control circuit transmits an alarm to the personal data device when the control circuit senses a back-up in the clean-out plug. The control circuit generates an audible alarm when the control circuit detects a back-up in the clean-out plug. The remote control sends a signal to the control circuit that causes the control circuit to generate an audible alarm.

14 Claims, 5 Drawing Sheets

(56) References Cited

U.S. PATENT DOCUMENTS

2014/0353370 A1 12/2014 Hendry
2016/0349406 A1 12/2016 Hennawy

* cited by examiner

CLEAN-OUT CAP LOCATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of an electric device for detecting a buried pipe.

SUMMARY OF INVENTION

The clean-out cap locator is a fitting. The clean-out cap locator is configured for use with a clean-out plug. The clean-out cap locator forms a cap that encloses the clean-out plug. The clean-out cap locator comprises a threaded cap, a control circuit, a remote control, and a personal data device. The control circuit mounts in the threaded cap. The threaded cap encloses the clean-out plug. The control circuit determines the GPS coordinates of the control circuit. The control circuit transmits the GPS coordinates of the control circuit to the personal data device. The control circuit generates an audible alarm indicating the location of the clean-out cap locator. The control circuit senses the flow of fluid around near the clean-out cap locator. The control circuit transmits an alarm to the personal data device when the control circuit senses a back-up in the clean-out plug. The control circuit generates an audible alarm when the control circuit detects a back-up in the clean-out plug. The remote control sends a signal to the control circuit that causes the control circuit to generate an audible alarm used to indicate the location of the clean-out cap locator.

These together with additional objects, features and advantages of the clean-out cap locator will be readily apparent to those of ordinary skill in the art upon reading the following detailed description of the presently preferred, but nonetheless illustrative, embodiments when taken in conjunction with the accompanying drawings.

In this respect, before explaining the current embodiments of the clean-out cap locator in detail, it is to be understood that the clean-out cap locator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clean-out cap locator.

It is therefore important that the claims be regarded as including such equivalent construction insofar as they do not depart from the spirit and scope of the clean-out cap locator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
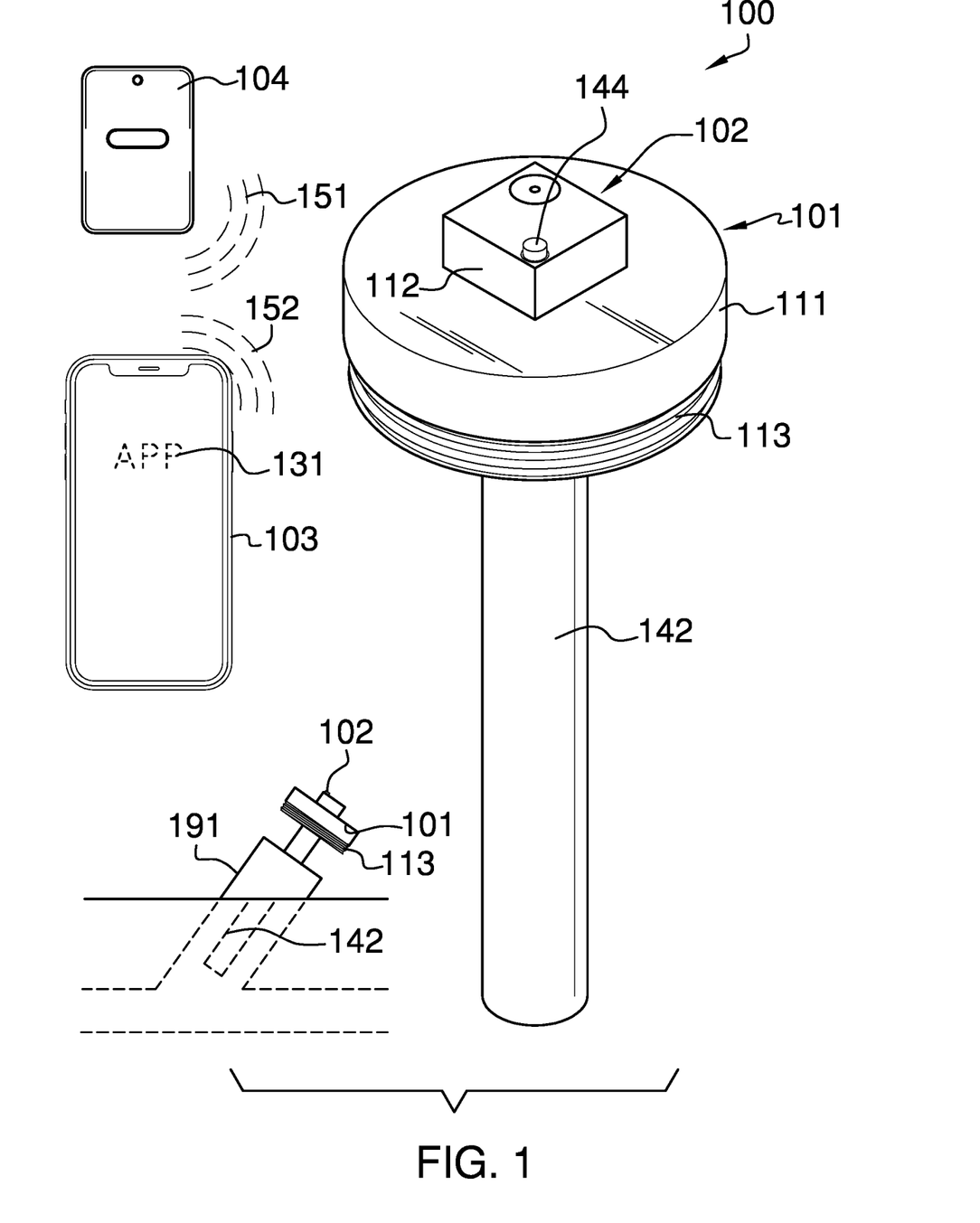
FIG. 1 is a perspective view of an embodiment of the disclosure.
Figure 2:
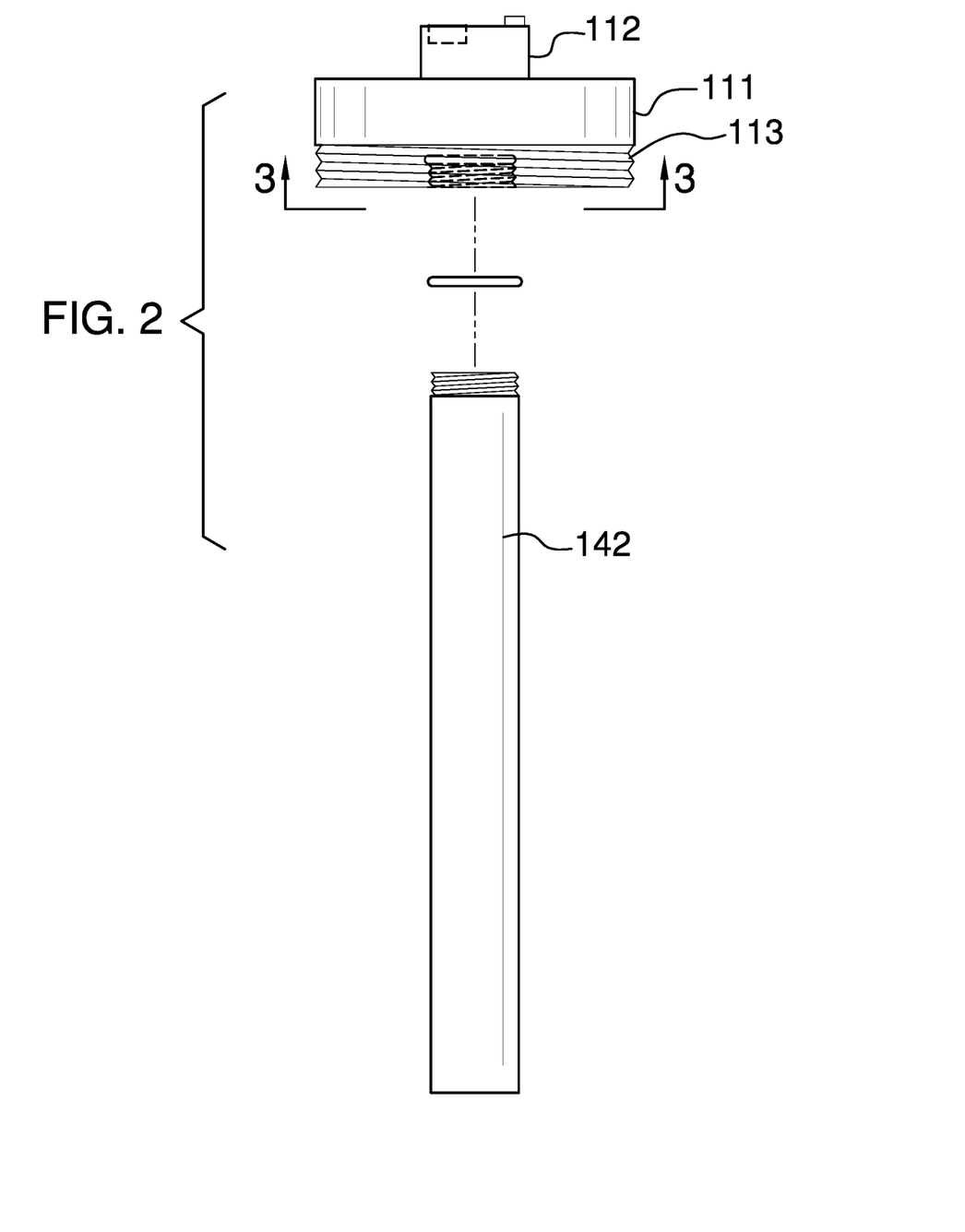
FIG. 2 is a front view of an embodiment of the disclosure.
Figure 3:
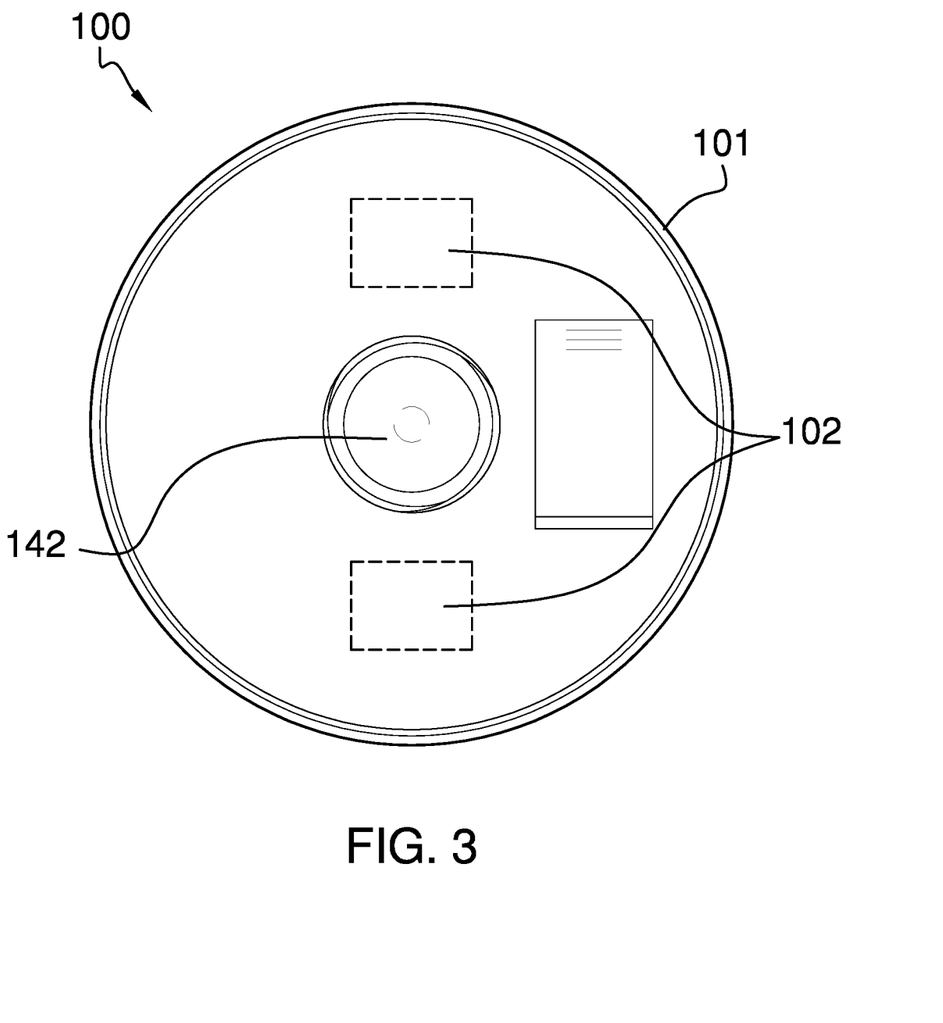
FIG. 3 is a detail view of an embodiment of the disclosure.
Figure 4:
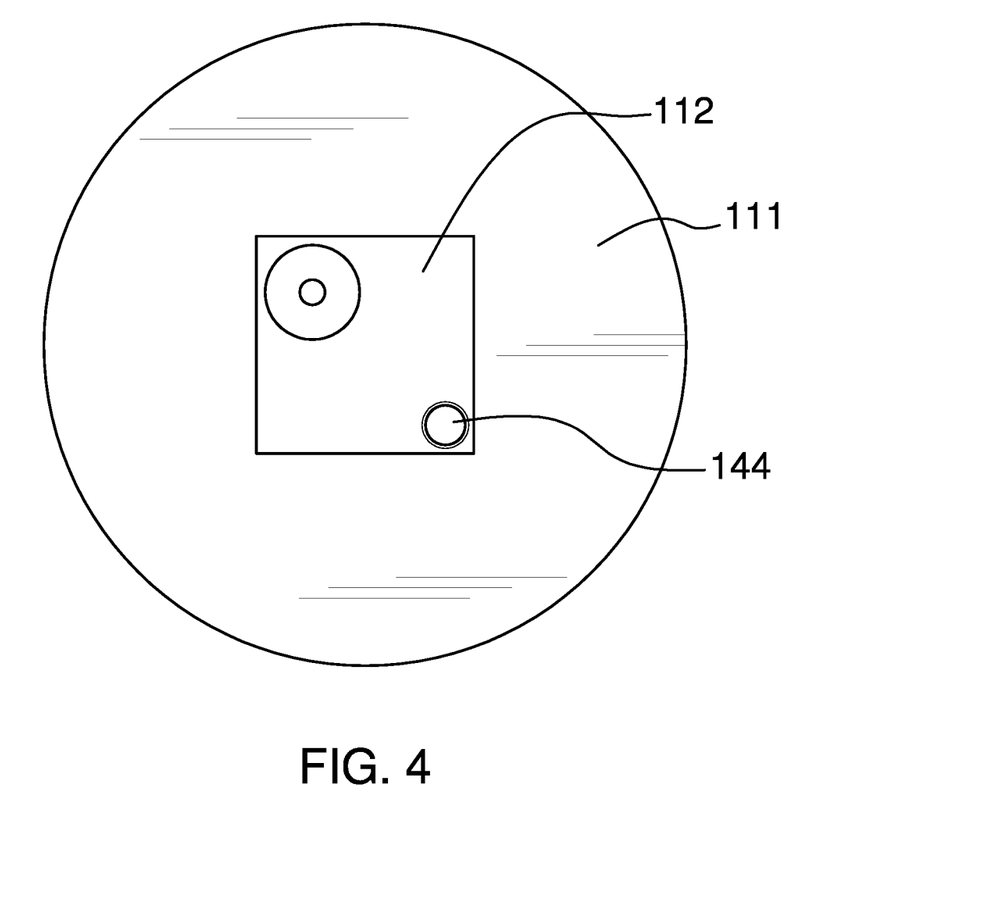
FIG. 4 is a detail view of an embodiment of the disclosure.
Figure 5:
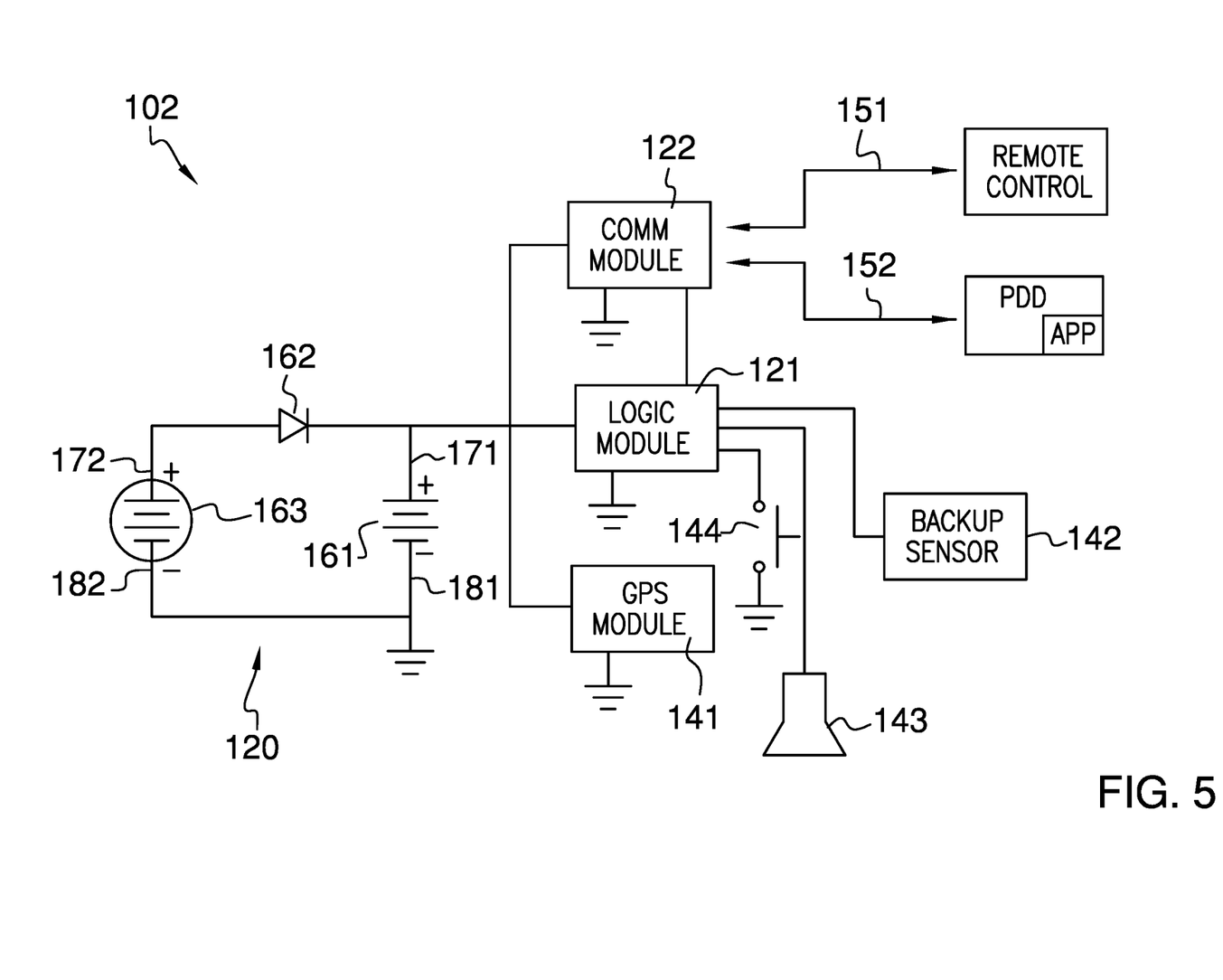
FIG. 5 is a schematic view of an embodiment of the disclosure.

Detailed reference will now be made to one or more potential embodiments of the disclosure, which are illustrated in FIGS. 1 through 5.

The clean-out cap locator 100 (hereinafter invention) is a fitting. The invention 100 is configured for use with a clean-out plug 191. The invention 100 forms a cap that encloses the clean-out plug 191. The invention 100 comprises a threaded cap 101, a control circuit 102, a remote control 104, and a personal data device 103. The control circuit 102 mounts in the threaded cap 101. The threaded cap 101 encloses the clean-out plug 191. The control circuit 102 determines the GPS coordinates of the control circuit 102. The control circuit 102 transmits the GPS coordinates of the control circuit 102 to the personal data device 103. The control circuit 102 generates an audible alarm indicating the location of the invention 100. The control circuit 102 senses the flow of fluid around near the invention 100. The control circuit 102 transmits an alarm to the personal data device 103 when the control circuit 102 senses a back-up in the clean-out plug 191. The control circuit 102 generates an audible alarm when the control circuit 102 detects a back-up in the clean-out plug 191. The remote control 104 sends a signal to the control circuit 102 that causes the control circuit 102 to generate an audible alarm used to indicate the location of the invention 100.

The threaded cap 101 is a mechanical structure. The threaded cap 101 is a fitting. The threaded cap 101 is a fitted structure that attaches to a clean-out plug 191. The threaded cap 101 encloses the clean-out plug 191. The threaded cap 101 uses a threaded connection 113 to attach to the clean-out plug 191. The threaded cap 101 comprises a pan structure 111, a housing structure 112, and a threaded connection 113.

The pan structure 111 is a hollow structure. The pan structure 111 is a prism shaped structure. The pan structure 111 has a pan shape. The pan structure 111 is sized such that the pan structure 111 screws into the clean-out port.

The housing structure 112 is a hollow structure. The housing structure 112 is a prism shaped structure. The housing structure 112 forms a protected space that contains the control circuit 102. The housing structure 112 is formed with all the apertures and form factors required to allow for the operation of the control circuit 102.

The threaded connection 113 is the fastening structure that allows the pan structure 111 to screw onto the clean-out port. The threaded connection 113 is defined elsewhere in this disclosure.

The control circuit 102 is an electric circuit. The control circuit 102 forms a wireless communication link with the remote control 104. The control circuit 102 forms a wireless communication link with the personal data device 103. The control circuit 102 is an independently powered electric circuit. By independently powered is meant that the control circuit 102 can operate without an electrical connection to an external power source.

The control circuit 102 determines the GPS coordinates of the control circuit 102. The control circuit 102 transmits the GPS coordinates of the control circuit 102 to the personal data device 103. The control circuit 102 generates an audible alarm indicating the location of the invention 100. The control circuit 102 senses the flow of fluid around near the invention 100. The control circuit 102 transmits an alarm to the personal data device 103 when the control circuit 102 senses a back-up in the clean-out plug 191. The control circuit 102 generates an audible alarm when the control circuit 102 detects a back-up in the clean-out plug 191. The remote control 104 sends a signal to the control circuit 102 that causes the control circuit 102 to generate an audible alarm used to indicate the location of the invention 100.

The control circuit 102 comprises a logic module 121, a communication module 122, and a power circuit 123. The logic module 121, the communication module 122, and the power circuit 123 are electrically interconnected. The communication module 122 comprises a first wireless communication link 151 and a second wireless communication link 152. The first wireless communication link 151 forms a communication link between the control circuit 102 and the remote control 104. The second wireless communication link 152 forms a communication link between the control circuit 102 and the personal data device 103.

The logic module 121 is a readily and commercially available programmable electronic device that is used to manage, regulate, and operate the control circuit 102. The communication module 122 is a wireless electronic communication device that allows the logic module 121 to wirelessly communicate with the personal data device 103.

Specifically, the communication module 122 establishes the second wireless communication link 152 between the control circuit 102 and the personal data device 103. In the first potential embodiment of the disclosure the communication module 122 supports a communication protocol selected from the group consisting of a WiFi™ protocol or a Bluetooth™ protocol. The logic module 121 transmits the GPS coordinates of the control circuit 102 to the personal data device 103. The logic module 121 transmits an alarm to the personal data device 103 when the back-up sensor 142 detects a back-up at the clean-out plug 191. The logic module 121 activates the speaker 143 when the personal data device 103 transmits a signal to the logic module 121 through the second wireless communication link 152 and the communication module 122.

The communication module 122 further establishes the first wireless communication link 151 between the control circuit 102 and the remote control 104. The logic module 121 activates the speaker 143 when the remote control 104 transmits a signal to the logic module 121 through the first wireless communication link 151 and the communication module 122. The logic module 121 activates and silences the speaker 143 in response to signals transmitted by the remote control 104.

The personal data device 103 is a programmable electrical device. The personal data device 103 further comprises an application 131. The personal data device 103 provides data management and communication services through one or more functions referred to as an application 131. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts.

The application 131 of the personal data device 103 forms an interface between the control circuit 102 and the personal data device 103. The personal data device 103 transmits operating instructions over the second wireless communication link 152 to the control circuit 102. The communication module 122 receives the transmitted operating instructions and relays the received operating instructions to the logic module 121.

The remote control 104 is an electric device. The remote control 104 is a radio frequency device. The remote control 104 transmits a plurality of control signals to the control circuit 102 that: a) initiates the control circuit 102 to generate an audible sound over the speaker 143; and, b) initiates the control circuit 102 to silence the speaker 143.

The logic module 121 comprises a GPS module 141, a back-up sensor 142, a speaker 143, and a silence switch 144. The GPS module 141 electrically connects to the logic module 121. The back-up sensor 142 electrically connects to the logic module 121. The speaker 143 electrically connects to the logic module 121. The silence switch 144 electrically connects to the logic module 121.

The GPS module 141 is an electrical device that communicates with the GPS to determine the GPS coordinates of the GPS module 141. The logic module 121 monitors the GPS module 141 to determine the GPS coordinates of the control circuit 102. The logic module 121 transmits the GPS coordinates of the control circuit 102 to the personal data device 103 using the communication module 122 and the second wireless communication link 152.

The back-up sensor 142 is an electric sensor. The back-up sensor 142 is positioned within the clean-out port to detect a backup of fluid within the clean-out port. The back-up sensor 142 transmits an electric signal to the logic module 121 when the detect a backup of fluid within the clean-out port. The logic module 121 monitors the area around the back-up sensor 142 for indications of an accumulation of fluid near the control circuit 102. The logic module 121 transmits an alarm message to the personal data device 103 indicating that the DWV is experiencing a backup. The logic module 121 generates a first electric signal that is transmitted to the speaker 143 indicating that the DWV is experiencing a backup.

The speaker 143 is a transducer. The speaker 143 receives first electric signal from the logic module 121. The speaker 143 converts the received first electric signal into an audible sound. In the first potential embodiment of the disclosure, the speaker 143 is a buzzer. The logic module 121 further generates the first electric signal that is transmitted to the speaker 143 when the communication module 122 receives a first transmission from the personal data device 103. The logic module 121 further generates the first electric signal that is transmitted to the speaker 143 when the communication module 122 receives a second transmission from the remote control 104. The logic module 121 silences the speaker 143 when the communication module 122 receives a third transmission from the personal data device 103. The logic module 121 silences the speaker 143 when the communication module 122 receives a fourth transmission from the remote control 104.

The silence switch 144 is a momentary switch. The silence switch 144 electrically connects to the logic module 121. The logic module 121 monitors the silence switch 144. The logic module 121 silences the speaker 143 when the silence switch 144 is actuated.

The power circuit 123 is an electrical circuit. The power circuit 123 powers the operation of the control circuit 102. The power circuit 123 is an electrochemical device. The power circuit 123 converts chemical potential energy into the electrical energy required to power the control circuit 102. The power circuit 123 comprises a battery 161, a diode 162, and a photovoltaic cell 163. The battery 161, the diode 162, and the photovoltaic cell 163 are electrically interconnected. The battery 161 further comprises a first positive terminal 171 and a first negative terminal 181. The photovoltaic cell 163 further comprises a second positive terminal 172 and a second negative terminal 182.

The battery 161 is an electrochemical device. The battery 161 converts chemical potential energy into the electrical energy used to power the control circuit 102. The battery 161 is a commercially available rechargeable battery 161. The photovoltaic cell 163 is an electrical device that converts light into electrical energy. The chemical energy stored within the rechargeable battery 161 is further renewed and restored through use of the photovoltaic cell 163. The photovoltaic cell 163 is directly wired to the battery 161. The photovoltaic cell 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The diode 162 is an electrical device that allows current to flow in only one direction. The diode 162 installs between the rechargeable battery 161 and the photovoltaic cell 163 such that electricity will not flow from the first positive terminal 171 of the rechargeable battery 161 into the second positive terminal 172 of photovoltaic cell 163. The photovoltaic cell 163 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Buzzer: As used in this disclosure, a buzzer is two lead electrical device that generates an audible sound when voltage is applied to the two leads.

Cap: As used in this disclosure, a cap is a protective structure that encloses a space, opening, or fitting.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean-Out Plug: As used in this disclosure, a clean-out plug is a capped port that provides access into the pipes of the drains of a plumbing system for the purpose of removing blockages within the plumbing system.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Domestic Plumbing System: As used in this disclosure, a domestic plumbing system refers to a fluidic network that is formed within a building. The domestic plumbing system transports water received from a utility through the building. Specifically, the domestic plumbing system: a) receives fresh water from the utility and distributes the fresh water through the building; and, b) transports gray water generated within the building and returns the gray water back to the utility for disposal. The domestic plumbing system comprises a supply side and a DWV.

DWV: As used in this disclosure, DWV is an acronym for drainage, waste, and vent. With a domestic plumbing system, DWV refers to the plumbing subnetwork that transports waste water out of the residence to an appropriate waste water handling system.

External Power Source: As used in this disclosure, an external power source is a source of the energy that is externally provided to enable the operation of the present disclosure. Examples of external power sources include, but are not limited to, electrical power sources and compressed air sources.

Exterior: As used in this disclosure, the exterior is used as a relational term that implies that an object is not contained within the boundary of a structure or a space.

Fitting: As used in this disclosure, a fitting is a component that attaches a first object to one or more additional objects. The fitting is often used to forming a fluidic connection between the first object and the one or more additional objects.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Interior: As used in this disclosure, the interior is used as a relational term that implies that an object is contained within the boundary of a structure or a space.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Personal Data Device: As used in this disclosure, a personal data device is a handheld logical device that is used for managing personal information and communication. Examples of personal data device include, but are not limited to, cellular phones, tablets, and smartphones.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Remote Control: As used in this disclosure, remote control means the establishment of control of a device from a distance. Remote control is generally accomplished through the use of an electrical device that generates electrically based control signals that are transmitted via radio frequencies or other means to the device.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Screw: As used in this disclosure, to screw is a verb meaning: 1) to fasten or unfasten (unscrew) a threaded connection; or 2) to attach a helical structure to a solid structure.

Supply Side: As used in this disclosure, the supply side refers to the plumbing subnetwork within a domestic plumbing system that provisions fresh water for use within the residence. See DWV.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Utility: As used in this disclosure, a utility is a commercial operation that provides an essential service to a community. The operation of a utility is often: a) regulated by a supervisory authority; or, b) provided by a governmental agency. A utility commonly: a) distributes to the community energy in the form of electricity of natural gas; and, b) distributes to the community fresh water and disposes of gray water that is generated by the community.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A clean-out cap locator comprising;
a threaded cap, a control circuit, a remote control, and a personal data device;
wherein the control circuit mounts in the threaded cap;
wherein the threaded cap encloses a clean-out plug;
wherein the control circuit forms a wireless communication link with the remote control;
wherein the control circuit forms a wireless communication link with the personal data device;
wherein the clean-out cap locator is a fitting;
wherein the clean-out cap locator forms a cap that encloses the clean-out plug;
wherein the control circuit determines the GPS coordinates of the control circuit;
wherein the control circuit transmits the GPS coordinates of the control circuit to the personal data device;
wherein the control circuit generates an alarm indicating the location of the clean-out cap locator;
wherein the control circuit senses the flow of fluid around and near the clean-out cap locator;
wherein the control circuit transmits an alarm to the personal data device when the control circuit senses a back-up in the clean-out plug;
wherein the control circuit generates an alarm when the control circuit detects a back-up in the clean-out plug;
wherein the remote control sends a signal to the control circuit that causes the control circuit to generate an alarm used to indicate the location of the clean-out cap locator;
wherein the control circuit comprises a logic module, a communication module, and a power circuit;
wherein the logic module, the communication module, and the power circuit are electrically interconnected;
wherein the communication module comprises a first wireless communication link and a second wireless communication link;
wherein the first wireless communication link forms a communication link between the control circuit and the remote control;
wherein the second wireless communication link forms a communication link between the control circuit and the personal data device.

2. The clean-out cap locator according to claim 1
wherein the threaded cap is a mechanical structure;
wherein the threaded cap is a fitting;
wherein the threaded cap is a fitted structure that attaches to a clean-out plug;
wherein the threaded cap encloses the clean-out plug;
wherein the threaded cap uses a threaded connection to attach to the clean-out plug.

3. The clean-out cap locator according to claim 2
wherein the control circuit is an electric circuit;
wherein the control circuit determines the GPS coordinates of the control circuit;
wherein the control circuit transmits the GPS coordinates of the control circuit to the personal data device;
wherein the control circuit generates an audible alarm indicating the location of the clean-out cap locator;
wherein the control circuit senses the flow of fluid around near the clean-out cap locator;
wherein the control circuit transmits an alarm to the personal data device when the control circuit senses a back-up in the clean-out plug;
wherein the control circuit generates an audible alarm when the control circuit detects a back-up in the clean-out plug;
wherein the remote control sends a signal to the control circuit that causes the control circuit to generate an audible alarm used to indicate the location of the clean-out cap locator.

4. The clean-out cap locator according to claim 3
wherein the control circuit is an independently powered electric circuit;
wherein by independently powered is meant that the control circuit can operate without an electrical connection to an external power source.

5. The clean-out cap locator according to claim 4
wherein the threaded cap comprises a pan structure, a housing structure, and a threaded connection;
wherein the pan structure is a hollow structure;
wherein the pan structure has a pan shape;
wherein the pan structure is sized such that the pan structure screws into the clean-out port;
wherein the housing structure is a hollow structure;
wherein the housing structure forms a protected space that contains the control circuit;
wherein the housing structure is formed with all the apertures and form factors required to allow for the operation of the control circuit;
wherein the threaded connection is the fastening structure that allows the pan structure to screw onto the clean-out port.

6. The clean-out cap locator according to claim 5
wherein the logic module is a programmable electronic device;
wherein the communication module is a wireless electronic communication device that allows the logic module to wirelessly communicate with the personal data device;
wherein the communication module establishes the second wireless communication link between the control circuit and the personal data device;
wherein the personal data device is a programmable electrical device;
wherein the personal data device further comprises an application;
wherein the application of the personal data device forms an interface between the control circuit and the personal data device;
wherein the personal data device transmits operating instructions over the second wireless communication link to the control circuit;
wherein the communication module receives the transmitted operating instructions and relays the received operating instructions to the logic module;
wherein the remote control is an electric device;
wherein the remote control is a radio frequency device;

wherein the remote control transmits a plurality of control signals to the control circuit that: a) initiates the control circuit to generate an audible sound over the speaker; and, b) initiates the control circuit to silence the speaker.

7. The clean-out cap locator according to claim 6
wherein the logic module comprises a GPS module, a back-up sensor, a speaker, and a silence switch;
wherein the GPS module electrically connects to the logic module;
wherein the back-up sensor electrically connects to the logic module;
wherein the speaker electrically connects to the logic module;
wherein the silence switch electrically connects to the logic module.

8. The clean-out cap locator according to claim 7
wherein the logic module transmits the GPS coordinates of the control circuit to the personal data device;
wherein the logic module transmits an alarm to the personal data device when the back-up sensor detects a back-up at the clean-out plug;
wherein the logic module activates the speaker when the personal data device transmits a signal to the logic module through the second wireless communication link and the communication module;
wherein the communication module further establishes the first wireless communication link between the control circuit and the remote control;
wherein the logic module activates the speaker when the remote control transmits a signal to the logic module through the first wireless communication link and the communication module;
wherein the logic module activates and silences the speaker in response to signals transmitted by the remote control.

9. The clean-out cap locator according to claim 8
wherein the GPS module is an electrical device that communicates with the GPS to determine the GPS coordinates of the GPS module;
wherein the logic module monitors the GPS module to determine the GPS coordinates of the control circuit;
wherein the logic module transmits the GPS coordinates of the control circuit to the personal data device using the communication module and the second wireless communication link.

10. The clean-out cap locator according to claim 9
wherein the back-up sensor is an electric sensor;
wherein the back-up sensor is positioned within the clean-out port to detect a backup of fluid within the clean-out port;
wherein the back-up sensor transmits an electric signal to the logic module when the detect a backup of fluid within the clean-out port;
wherein the logic module monitors the area around the back-up sensor for indications of an accumulation of fluid near the control circuit.

11. The clean-out cap locator according to claim 10
wherein the speaker is a transducer;
wherein the speaker receives first electric signal from the logic module;
wherein the speaker converts the received first electric signal into an audible sound;
wherein in the first potential embodiment of the disclosure, the speaker is a buzzer;
wherein the logic module further generates the first electric signal that is transmitted to the speaker when the communication module receives a first transmission from the personal data device;
wherein the logic module further generates the first electric signal that is transmitted to the speaker when the communication module receives a second transmission from the remote control;
wherein the logic module silences the speaker when the communication module receives a third transmission from the personal data device;
wherein the logic module silences the speaker when the communication module receives a fourth transmission from the remote control.

12. The clean-out cap locator according to claim 11
wherein the silence switch is a momentary switch;
wherein the silence switch electrically connects to the logic module;
wherein the logic module monitors the silence switch;
wherein the logic module silences the speaker when the silence switch is actuated.

13. The clean-out cap locator according to claim 12
wherein the power circuit is an electrical circuit;
wherein the power circuit powers the operation of the control circuit;
wherein the power circuit comprises a battery, a diode, and a photovoltaic cell;
wherein the battery, the diode, and the photovoltaic cell are electrically interconnected;
wherein the battery further comprises a first positive terminal and a first negative terminal;
wherein the photovoltaic cell further comprises a second positive terminal and a second negative terminal.

14. The clean-out cap locator according to claim 13
wherein the battery is a rechargeable battery;
wherein the photovoltaic cell is an electrical device that converts light into electrical energy;
wherein the photovoltaic cell is directly wired to the battery;
wherein the photovoltaic cell is an electrical circuit that reverses the polarity of the rechargeable battery;
wherein the diode is an electrical device that allows current to flow in only one direction;
wherein the diode installs between the rechargeable battery and the photovoltaic cell such that electricity will not flow from the first positive terminal of the rechargeable battery into the second positive terminal of photovoltaic cell.

* * * * *